US009654441B2

(12) United States Patent
Ginzboorg et al.

(10) Patent No.: US 9,654,441 B2
(45) Date of Patent: May 16, 2017

(54) LIMITING RATE OF MAC ADDRESS CHANGE IN WIRELESS MODEM

(75) Inventors: Philip Ginzboorg, Espoo (FI); Valtteri Niemi, Naantali (FI); Kari Leppanen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 35 days.

(21) Appl. No.: 14/238,339

(22) PCT Filed: Aug. 12, 2011

(86) PCT No.: PCT/IB2011/053599
§ 371 (c)(1), (2), (4) Date: Apr. 16, 2014

(87) PCT Pub. No.: WO2013/024322
PCT Pub. Date: Feb. 21, 2013

(65) Prior Publication Data

US 2014/0254384 A1 Sep. 11, 2014

(51) Int. Cl.

| | |
|---|---|
| ***H04L 29/12*** | (2006.01) |
| ***H04W 24/02*** | (2009.01) |
| *H04L 29/06* | (2006.01) |
| *H04W 8/26* | (2009.01) |
| *H04W 84/12* | (2009.01) |

(52) U.S. Cl.
CPC .......... *H04L 61/20* (2013.01); *H04L 61/2038* (2013.01); *H04L 61/2092* (2013.01); *H04L 61/6022* (2013.01); *H04W 24/02* (2013.01); *H04L 63/1466* (2013.01); *H04W 8/26* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,379,423 | B1 * | 5/2008 | Caves et al. | 370/232 |
| 7,706,539 | B2 * | 4/2010 | Jang et al. | 380/270 |
| 8,243,595 | B2 * | 8/2012 | Gooch et al. | 370/230 |
| 2003/0177267 | A1 | 9/2003 | Orava et al. | |

(Continued)

FOREIGN PATENT DOCUMENTS

| | | | |
|---|---|---|---|
| CN | 1489339 | A | 4/2004 |
| CN | 101141493 | A | 3/2008 |

(Continued)

OTHER PUBLICATIONS

WiFi Alliance Technical Committee Quality of Service (QoS) Task Group, "WMM™ (including WMM™ Power Save) Specification", Wi-Fi Alliance, Version 1.2, 39 pgs.

(Continued)

*Primary Examiner* — Rhonda Murphy
(74) *Attorney, Agent, or Firm* — Harrington & Smith

(57) ABSTRACT

A method includes receiving a command to change a medium access control (MAC) address associated with a wireless local area network (WLAN) apparatus; and changing the medium access control address, without restarting a wireless modem of the apparatus, only if a restriction on an allowed rate of medium access control address changes is not violated. An apparatus that operates in accordance with the method is also described.

19 Claims, 3 Drawing Sheets

RECEIVING A COMMAND TO CHANGE A MEDIUM ACCESS CONTROL ADDRESS ASSOCIATED WITH A WIRELESS LOCAL AREA NETWORK APPARATUS — 3A

CHANGING THE MEDIUM ACCESS CONTROL ADDRESS, WITHOUT RESTARTING A WIRELESS MODEM OF THE APPARATUS, ONLY IF A RESTRICTION ON AN ALLOWED RATE OF MEDIUM ACCESS CONTROL ADDRESS CHANGES IS NOT VIOLATED — 3B

(56) References Cited

U.S. PATENT DOCUMENTS

| | | | | |
|---|---|---|---|---|
| 2004/0097260 | A1* | 5/2004 | Stenton | H04W 48/16 455/552.1 |
| 2005/0044273 | A1* | 2/2005 | Bouchat et al. | 709/245 |
| 2006/0120317 | A1* | 6/2006 | Zheng | 370/315 |
| 2011/0202760 | A1* | 8/2011 | Hahn | H04W 12/06 713/162 |

FOREIGN PATENT DOCUMENTS

| | | | |
|---|---|---|---|
| CN | 101959181 | A | 1/2011 |
| EP | 1 379 029 | A1 | 1/2004 |
| WO | WO 03/041358 | A1 | 5/2003 |

OTHER PUBLICATIONS

"Cable Modem Troubleshooting Tips", Swapping computers on the cable modem, http://homepage.ntlworld.com/robin.d.h.walker/cmtips/swap.html, 2 pgs.

Pekko Orava (Nokia) et al. *Temporary MAC Addresses for Anonymity*; IEEE Draft; 11-02-0261-02000I-Temporary-MAC-Addresses-For-Anonymity, IEEE-SA Mentor, Piscataway, NJ USA vol. 802.11i, No. 2, Jun. 26, 2002, pp. 1-17.

* cited by examiner

LIMITING RATE OF MAC ADDRESS CHANGE IN WIRELESS MODEM

TECHNICAL FIELD

The exemplary and non-limiting embodiments of this invention relate generally to wireless communication systems, methods, devices and computer programs and, more specifically, relate to wireless local area networks, modems, ad hoc networking and medium access control (MAC) address assignments to mobile devices.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

API application program interface

MAC medium access control

WLAN wireless local area network

Wi-Fi is a branded standard for wirelessly connecting electronic devices. A Wi-Fi device, such as a personal computer, video game console, smartphone, or digital audio player can connect to the Internet via a wireless network access point. An access point (or hotspot) has a range of about 20 meters (65 feet) indoors and a greater range outdoors. Multiple overlapping access points can cover large areas. "Wi-Fi" is a trademark of the Wi-Fi Alliance, and the term is a simple brand name for the IEEE 802.11 standard.

A MAC address functions as an identity of a device and is presented to external devices. In at least some conventional mobile devices (e.g., mobile phones) it can be necessary to restart the WiFi modem (modulator/demodulator) of the device in order to change the MAC address of the device. This can be due to, for example, the fact that a conventional WiFi modem may change MAC address only at boot time. Rebooting the modem can require several seconds. As a result a maximum rate of MAC address changes can be limited to a period of time on the order of about ten seconds. One benefit of this restriction is that an attacker (a person with malicious intent) cannot use the mobile device to masquerade as more than about six different nodes per minute.

SUMMARY

In a first aspect thereof the exemplary embodiments of this invention pertain to a method that comprises receiving a command to change a medium access control address associated with a wireless local area network apparatus; and changing the medium access control address, without restarting a wireless modem of the apparatus, only if a restriction on an allowed rate of medium access control address changes is not violated.

In a further aspect thereof the exemplary embodiments of this invention pertain to an apparatus that comprises at least one data processor and at least one memory including computer program code. The memory and computer program code are configured to, with the at least one processor, cause the apparatus to receive a command to change a medium access control address associated with a wireless local area network apparatus; and to change the medium access control address, without restarting a wireless modem of the apparatus, only if a restriction on an allowed rate of medium access control address changes is not violated.

In a still further aspect thereof the exemplary embodiments of this invention pertain to an apparatus that comprises means for receiving a command from a host processor to change a medium access control address associated with a wireless local area network apparatus; and means for changing the medium access control address, without restarting a wireless modem of the apparatus, only if a restriction on an allowed mean rate of medium access control address changes is not violated. In the apparatus the restriction is implemented by executing a leaky bucket algorithm that adds a token at a rate set by a predetermined allowed mean time A between medium access control address changes and that extracts a token each time that the medium access control address is changed, and where an address change criterion is that there is at least one token available to be extracted.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

It is desirable that a mobile device, such as a Nokia Instant Community (NIC) device, should be able to occasionally change its MAC address. This can be done to at least enhance the location privacy of the device. However, since restarting the WiFi modem causes breaks in both NIC and non-NIC communication, the MAC address changes should preferably be performed without restarting the modem. It is desirable that a WiFi modem compliant with, for example, the NIC WiFi firmware specification, be able to change its MAC address without the need to restart. However, if one increases the rate at which the MAC address of the modem can be changed, without having to restart the modem, then an attacker could potentially use this feature to masquerade as a large number of devices within a relatively short period of time.

An aspect of the exemplary embodiments of this invention is to provide a mobile device that is capable of changing its MAC address without having to reboot, while enforcing a maximum rate at which the MAC address can be changed per unit of time.

Figure 1:
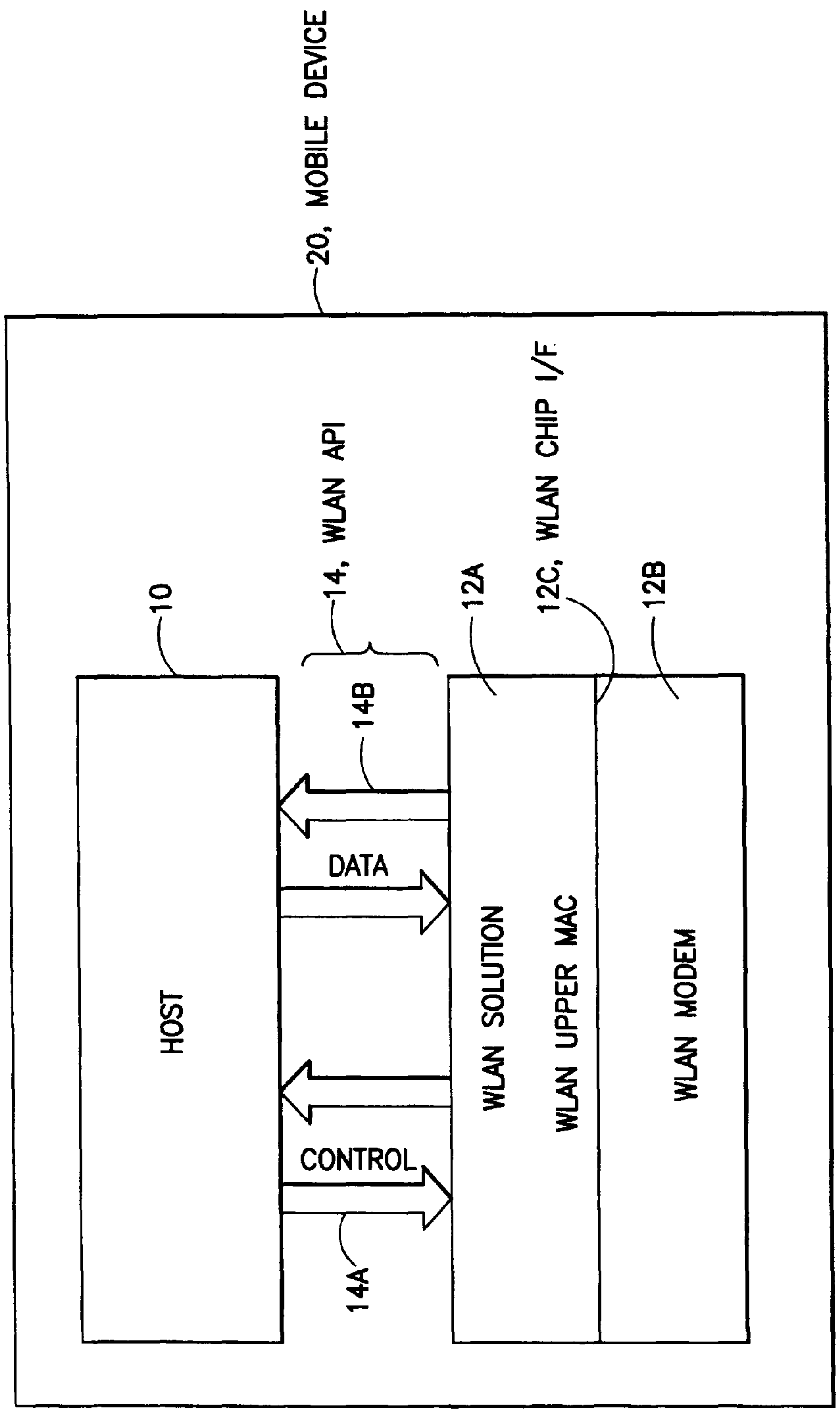
FIG. 1 shows a logical architecture that is suitable for implementing this invention, where the architecture is divided into a host and a WLAN solution having a WLAN upper MAC portion and a WLAN modem portion.

The exemplary embodiments of this invention can employ the logical architecture depicted in FIG. 1, wherein the architecture is divided into a host 10 and a WLAN solution 12. The host 10 can be represented as one or more processors of a mobile device 20, and is assumed to include at least one memory that stores computer program code that is accessible by the processor(s) and that can be executed by the processor(s).

The various embodiments of the mobile device 20 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. In some embodiments the device 20 need not be mobile, such as when implemented as a desktop computer or other type of basically stationary device having WLAN capabilities.

The main functionality related to the WLAN operational modes can be located in the WLAN solution 12. The interface between the host 10 and the WLAN solution 12 can be implemented as a WLAN API 14 that provides the means for the host 10 to control operations of the WLAN solution 12. The WLAN API 14 also provides a mechanism for the host 10 to request Action frame transmissions and to receive Action frames that the WLAN solution 12 has received over the air. The WLAN solution 12 comprises two main elements: a WLAN upper MAC 12A and a WLAN modem 12B. The WLAN upper MAC 12A represents that part of the WLAN solution 12 that is run in a processor that is physically separate from the WLAN modem 12B. The WLAN upper MAC 12A interfaces to the WLAN modem 12B via a WLAN chip interface 12C.

For the WLAN API 14 it is desirable that a specification controls the parameters and functions that the host 10 requires to assert control over the WLAN API 14. The WLAN API 14 can be generally considered to be implemented using at least one bidirectional control bus 14A over which commands can be sent and at least one bidirectional data bus 14B.

Note that the logical architecture depicted in FIG. 1 is but one suitable implementation in which the exemplary embodiments of this invention may be realized, and should not be viewed as limiting the exemplary embodiments of this invention in any way.

An aspect of the exemplary embodiments of this invention imposes a deliberate restriction on the frequency at which (the rate at which) the WiFi modem (WLAN modem 12B) can change MAC addresses (without restarting).

The restriction on the rate at which the WiFi modem (WLAN modem 12B) can change MAC addresses is selected such that it is sufficient to prevent one device from masquerading as a ‘crowd’ of devices, on the one hand; while not preventing the MAC addresses from being changed so slowly as to defeat the purpose of providing the ability to change the MAC addresses (e.g., to enhance location privacy of the user of the device).

In the exemplary embodiments the WLAN modem 12B is enhanced to include a mechanism to control a maximum rate at which the MAC address can be changed. As a non-limiting example a rate of one change per second will be considered although another value (e.g., one change in 5 seconds, or 10 seconds) could be used as well. The restriction is preferably understood in the sense of averages: the time between some MAC address changes may be less than 1 s, provided that the mean time is at least one second. In general there is some desired and predetermined allowed mean time A between medium access control address changes.

In operation a new MAC address is generated by the host processor 10 and given by the host processor 10 to the WLAN solution 12 in a MAC address change request. The WLAN modem 12B indicates to the host processor 10 the success or the failure of the requested MAC address change. In the case of a failure the indication could contain as a payload the one second time parameter. This failure indication can be interpreted by the host processor 10 as a request to retry the MAC address change in one second.

Figure 2:
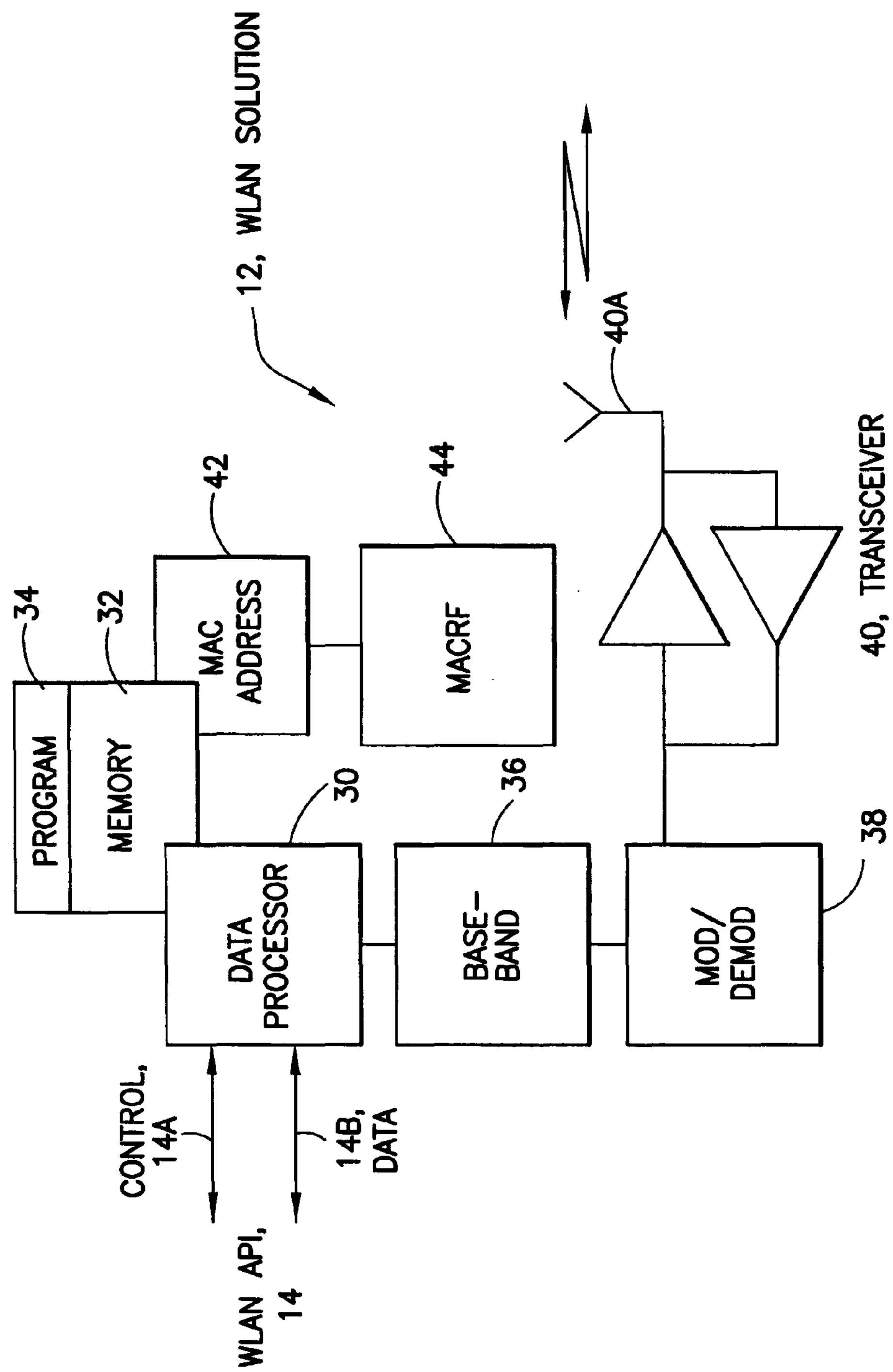
FIG. 2 depicts a non-limiting example of a simplified block diagram and logical organization of the WLAN solution shown in FIG. 1.

Reference is made to FIG. 2 for showing a non-limiting example of a simplified block diagram and logical organization of the WLAN solution 12. The WLAN solution 12 includes at least one data processor 30 and at least one associated non-transitory computer readable medium such as a memory 32 that stores computer program instructions 34. The computer program instructions 34 are executable by the data processor 30 and result in the overall control and operation of the WLAN solution 12. The data processor 30 is assumed to be interconnected with the WLAN API 14 and thus is connected with the host 10. Via the WLAN API 14 the data processor receives MAC address change commands from the host 10, and can send to the host 10 a status indication (success/failure) of a requested MAC address change command. The WLAN solution 12 also includes, typically as part of the WLAN modem 12B, at least one baseband unit 36, at least one modulator/demodulator unit 38 and at least one radio frequency transmitter/receiver (transceiver) pair 40 connected to an antenna 40A. The data processor 30 and the baseband unit 36 can be interconnected via, for example, the WLAN chip interface 12C shown in FIG. 1. Also shown is a MAC address storage 42 that stores a currently used MAC address, as well as a MAC address change restriction functionality (MACRF) 44 that operates in accordance with the exemplary embodiments of this invention. The MAC address storage 42 can be considered as a part of the memory 32 as shown, or it could be implemented as a separate hardware register. The MAC address change restriction functionality (MACRF) 44 can be implemented solely as a part of the computer program instructions (software) 34, or it can be implemented solely as hardware logic elements, or it can be implemented as a combination of software and hardware (and/or firmware).

In FIG. 2 the computer-readable medium 32 may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processor 30 may be of any type suitable to the local technical environment, and may include one or more of general purpose computers, special purpose computers, microprocessors, digital signal processors (DSPs) and processors based on multi-core processor architectures, as non-limiting examples.

In one exemplary embodiment of this invention the MAC address change restriction functionality (MACRF) 44 can be implemented in the WLAN radio modem 12B using a ‘leaky-bucket’ method or algorithm. For example, a ‘token bucket’ could be used as follows: (1) the minimum number of tokens accumulated in the bucket is zero and the maximum number of tokens accumulated in the bucket is 10; (2) a token is added to the bucket once per second and is deleted (removed) from the bucket by each MAC address change; and (3) the MAC address 42 may be changed only if there is at least one token in the bucket.

The leaky-bucket approach to implementing the MAC address change restriction functionality 44 is but one suitable example. For example, another implementation uses a Simple Moving Average (SMA) or 'sliding window' method or algorithm. The WLAN solution 12 stores in the memory 32 the times of the last w MAC address changes: X(k), X(k−1), , . . . , X(k−w+1). Let t be a current time at which the MAC address change is requested by the host 10. The MAC address change restriction functionality 44 rejects the MAC address change request if $(t-X(k-w+1))/w<1$ second; otherwise the MAC address change restriction functionality 44 permits the change of the MAC address, shifts the sequence X(k), X(k−1), , . . . , X(k−w+1) to the left (the last item X(k−w+1) is deleted from the sequence by the shift), and sets X(k) to t.

Yet another exemplary implementation of the MAC address change restriction functionality 44 uses an Exponential Moving Average (EMA) method or algorithm to estimate the mean time M between MAC address changes. As before, let t be the current time at which the MAC address change is requested by the host 10. Denote by X the time in seconds of the last MAC address change, and by y a temporary variable. M and X could be initialized, for example, to 10 and 0, respectively. The MAC address change restriction functionality 44 first computes a temporary estimate of M by: $y=(1-\alpha)M+\alpha(t-X)$, where the weight $\alpha\in(0, 1)$. The MAC address change restriction functionality 44 rejects the MAC address change request if y<1 s; otherwise it changes the MAC address 42 as requested and sets: X=t, M=y.

Note that in some embodiments there can be pseudonym mechanism that causes: (i) a deterministic change of device pseudonyms (network and MAC addresses) by all devices at 00:00 UTC and (ii) a change of device pseudonym if a counter of messages sent by that device rolls over between the deterministic changes. After the restriction on the rate of MAC address changes have been implemented in the WLAN solution 12 in accordance with the exemplary embodiments of this invention the foregoing features (i) and/or (ii) may be prevented in some cases.

However, changes of network and MAC addresses caused by the pseudonym mechanism can be adapted to the minimum of, e.g., the one second restriction to eliminate those cases. This can be accomplished by 'locking' those addresses so that they cannot be changed by any entity other than the pseudonym change implementation at least: (i) one second (more generally A seconds) before 00:00 UTC, or (ii) some number (e.g., 1000) of messages are sent before rollover of the message counter; and releasing the lock after: (i) the MAC address change at 00:00 UTC, and (ii) the rollover of the message counter.

Based on the foregoing it should be apparent that the exemplary embodiments of this invention provide a method, apparatus and computer program(s) to control a rate at which a MAC address of a wireless device can be changed.

Figure 3:
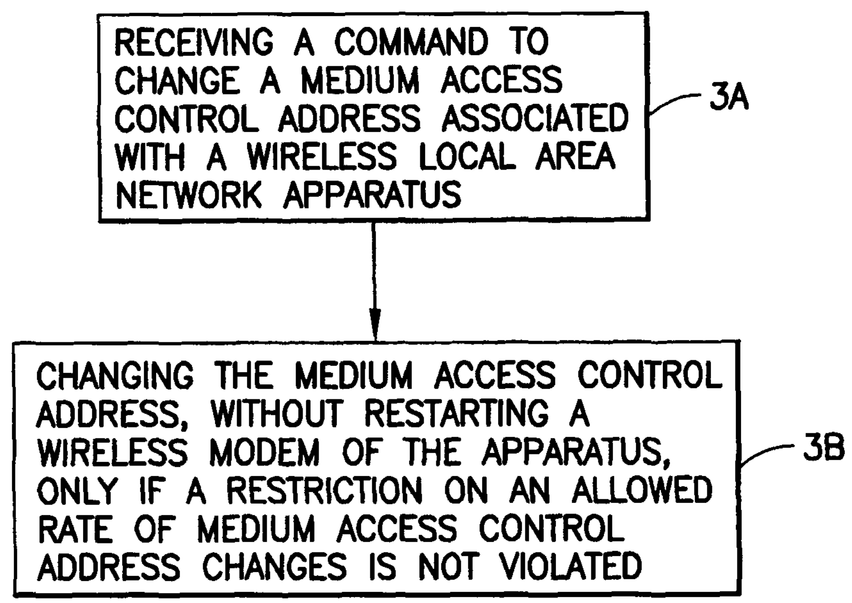
FIG. 3 is a logic flow diagram that illustrates the operation of a method, and a result of execution of computer program instructions, in accordance with the exemplary embodiments of this invention.

FIG. 3 is a logic flow diagram that illustrates the operation of a method, and a result of execution of computer program instructions, in accordance with the exemplary embodiments of this invention. In accordance with these exemplary embodiments a method performs, at Block 3A, a step of receiving a command to change a medium access control address associated with a wireless local area network apparatus. At Block 3B there is a step of changing the medium access control address, without restarting a wireless modem of the apparatus, only if a restriction on an allowed rate of medium access control address changes is not violated.

In the method of FIG. 3, where the allowed rate is an allowed mean rate.

In the method of FIG. 3, where the restriction is implemented by executing a leaky bucket algorithm that adds a token at a rate set by a predetermined allowed mean time A between medium access control address changes and that extracts a token each time that the medium access control address is changed, and where an address change criterion is that there is at least one token available to be extracted.

In the method of FIG. 3, where the restriction is implemented by executing a simple moving average algorithm that stores the times of the last w medium access control address changes: X(k), X(k−1), . . . , X(k−w+1), where t is a current time at which the medium access control address change command is received and A is an allowed mean time between medium access control address changes, rejecting the medium access control address change command if $(t-X(k-w+1))/w<A$ otherwise an address change criterion is deemed to be satisfied and changing the medium access control address, shifting the sequence X(k), X(k−1), , . . . , X(k−w+1), deleting the last item X(k−w+1) from the sequence, and setting X(k) to t.

In the method of FIG. 3, where the restriction is implemented by executing an exponential moving average algorithm to estimate the mean time M between medium access control address changes, where t is a current time at which the medium access control address change command is received and A is an allowed mean time between medium access control address changes, denoting by X the time in seconds of the last medium access control address change and by y a temporary variable, initializing M and X to values where M>X, computing a temporary estimate of M by: $y=(1-\alpha)M+\alpha(t-X)$, where a weight $\alpha\in(0, 1)$, rejecting the medium access control address change command if y<A otherwise an address change criterion is deemed to be satisfied and changing the medium access control address and setting X=t, M=y.

In the method of FIG. 3 and the preceding paragraph where M and X are initialized to M=10 and X=0.

In the method of FIG. 3 and the preceding several paragraphs descriptive of FIG. 3, where the command is received at the wireless local area network apparatus from a host processor, and further comprising sending the host processor an indication of whether the medium access control address change was accomplished or was not accomplished.

In the method of FIG. 3 and the preceding several paragraphs descriptive of FIG. 3, where A is one second or greater.

In the method of FIG. 3 and the preceding several paragraphs descriptive of FIG. 3, further comprising locking the medium access control address from being changed A seconds prior to a predetermined medium access control address change time, where A is a predetermined allowed mean time between medium access control address changes.

In the method of FIG. 3 and the preceding several paragraphs descriptive of FIG. 3, further comprising locking the medium access control address from being changed when some number of messages have been sent from the apparatus that is less than a message counter rollover number, where the message counter rolling over automatically triggers a medium access control address change.

The exemplary embodiments also encompass a non-transitory computer-readable medium that contains software program instructions, where execution of the software program instructions by at least one data processor results in performance of operations that comprise execution of the method o FIG. 3 and the preceding several paragraphs descriptive of FIG. 3.

The various blocks shown in FIG. 3 may be viewed as method steps, and/or as operations that result from operation of computer program code, and/or as a plurality of coupled logic circuit elements constructed to carry out the associated function(s).

As was noted previously, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such the exemplary embodiments of this invention also pertain to an apparatus that comprises at least one data processor and at least one memory including computer program code. The memory and computer program code are configured to, with the at least one processor, cause the apparatus to receive a command to change a medium access control address associated with a wireless local area network apparatus; and change the medium access control address, without restarting a wireless modem of the apparatus, only if a restriction on an allowed rate of medium access control address changes is not violated.

The exemplary embodiments of this invention also encompass an apparatus that comprises means for receiving a command to change a medium access control address associated with a wireless local area network apparatus; and means for changing the medium access control address, without restarting a wireless modem of the apparatus, only if a restriction on an allowed rate of medium access control address changes is not violated.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the WiFi system it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described methods (e.g., 'leaky bucket', SMA, EMA, etc.) are not intended to be limiting in any respect, as these methods may be identified by any suitable names. Further, the formulas and mathematical expressions described above may differ from those expressly disclosed herein.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:

in a mobile communication device that comprises a wireless local area network apparatus and a host data processor, receiving a command to change a medium access control address associated with the wireless local area network apparatus; and changing the medium access control address, without restarting a wireless local area network modem of the wireless local area network apparatus, only if a restriction on an allowed rate of medium access control address changes is not violated;

where the wireless local area network apparatus is comprised of a wireless local area network solution and the wireless local area network modem and, where the command is generated by and received from the host data processor; and where the command comprises a new medium access control address that is generated by the host data processor.

2. The method of claim 1, where the allowed rate is an allowed mean rate.

3. The method as in claim 1, where the restriction is implemented by executing a leaky bucket algorithm that adds a token at a rate set by a predetermined allowed mean time A between medium access control address changes and that extracts a token each time that the medium access control address is changed, and where an address change criterion is that there is at least one token available to be extracted.

4. The method of claim 1, where the restriction is implemented by executing a simple moving average algorithm that stores the times of the last w medium access control address changes: X(k), X(k−1), X(k−w+1), where t is a current time at which the medium access control address change command is received and A is an allowed mean time between medium access control address changes, rejecting the medium access control address change command if $(t-X(k-w+1))/w<A$ otherwise an address change criterion is deemed to be satisfied and changing the medium access control address, shifting the sequence X(k), X(k−1), , . . . , X(k−w+1), deleting the last item X(k−w+1) from the sequence, and setting X(k) to t.

5. The method of claim 1, where the restriction is implemented by executing an exponential moving average algorithm to estimate the mean time M between medium access control address changes, where t is a current time at which the medium access control address change command is received and A is an allowed mean time between medium access control address changes, denoting by X the time in seconds of the last medium access control address change and by y a temporary variable, initializing M and X to values where M>X, computing a temporary estimate of M by: $y=(1-\alpha)M+\alpha(t-X)$, where a weight $\alpha\epsilon(0, 1)$, rejecting the medium access control address change command if $y<A$ otherwise an address change criterion is deemed to be satisfied and changing the medium access control address and setting X=t, M=y.

6. The method as in claim 1, further comprising locking the medium access control address from being changed A seconds prior to a predetermined medium access control address change time, where A is a predetermined allowed mean time between medium access control address changes.

7. The method as in claim 1, further comprising locking the medium access control address from being changed when some number of messages have been sent from the apparatus that is less than a message counter rollover number, where the message counter rolling over automatically triggers a medium access control address change.

8. The method as in claim 1, where in response to receiving the command the wireless local area network apparatus sends a response to the host data processor to indicate one of a success or a failure to change the medium access control address to the new medium access control address.

9. The method as in claim 8, where for a case that the response indicates a failure, the response further comprises a value of the allowed rate of medium access control address changes.

10. The method as in claim 9, where the value of the allowed rate of medium access control address changes is equal to about one per second or greater.

11. An apparatus, comprising:

at least one data processor; and at least one memory including computer program code, where the memory and computer program code are configured to, with the at least one processor, cause the apparatus to, receive a command to change a medium access control address associated with a wireless local area network apparatus; and change the medium access control address, without restarting a wireless local area network modem of the apparatus, only if a restriction on an allowed rate of medium access control address changes is not violated;

where the apparatus is embodied as a mobile communication device that comprises the wireless local area network apparatus and a host data processor, where the wireless local area network apparatus is comprised of a wireless local area network solution and the wireless local area network modem, where the command is generated by and received from the host data processor, and where the command comprises a new medium access control address that is generated by the host data processor.

12. The apparatus as in claim 11, where the allowed rate is an allowed mean rate.

13. The apparatus as in claim 11, where said at least one data processor in conjunction with the computer program code is configured to implement the restriction by executing a leaky bucket algorithm that adds a token at a rate set by a predetermined allowed mean time A between medium access control address changes and that extracts a token each time that the medium access control address is changed, and where an address change criterion is that there is at least one token available to be extracted.

14. The apparatus as in claim 11, where said at least one data processor in conjunction with the computer program code is configured to implement the restriction by executing a simple moving average algorithm that stores the times of the last w medium access control address changes: X(k), X(k−1), . . . , X(k−w+1), where t is a current time at which the medium access control address change command is received and A is an allowed mean time between medium access control address changes, rejecting the medium access control address change command if $(t-X(k-w+1))/w<A$ otherwise an address change criterion is deemed to be satisfied and changing the medium access control address, shifting the sequence X(k), X(k−1), , . . . , X(k−w+1), deleting the last item X(k−w+1) from the sequence, and setting X(k) to t.

15. The apparatus as in claim 11, where said at least one data processor in conjunction with the computer program code is configured to implement the restriction by executing an exponential moving average algorithm to estimate the mean time M between medium access control address changes, where t is a current time at which the medium access control address change command is received and A is an allowed mean time between medium access control address changes, denoting by X the time in seconds of the last medium access control address change and by y a temporary variable, initializing M and X to values where M>X, computing a temporary estimate of M by: $y=(1-\alpha)M+\alpha(t-X)$, where a weight $\alpha\epsilon(0, 1)$, rejecting the medium access control address change command if $y<A$ otherwise an address change criterion is deemed to be satisfied and changing the medium access control address and setting X=t, M=y.

16. The apparatus as in claim 11, where said at least one data processor in conjunction with the computer program code is further configured to send the host processor an indication of whether the medium access control address change was accomplished or was not accomplished.

17. The apparatus as in claim 11, where said at least one data processor in conjunction with the computer program code is configured to lock the medium access control address from being changed A seconds prior to a predetermined medium access control address change time, where A is a predetermined allowed mean time between medium access control address changes.

18. The apparatus as in claim 11, where said at least one data processor in conjunction with the computer program code is configured to lock the medium access control address from being changed when some number of messages have been sent from the apparatus that is less than a message counter rollover number, where the message counter rolling over automatically triggers a medium access control address change.

19. The apparatus as in claim 11, embodied at least partially as a wireless local area network modem contained in a mobile device.

* * * * *